Figure 1:
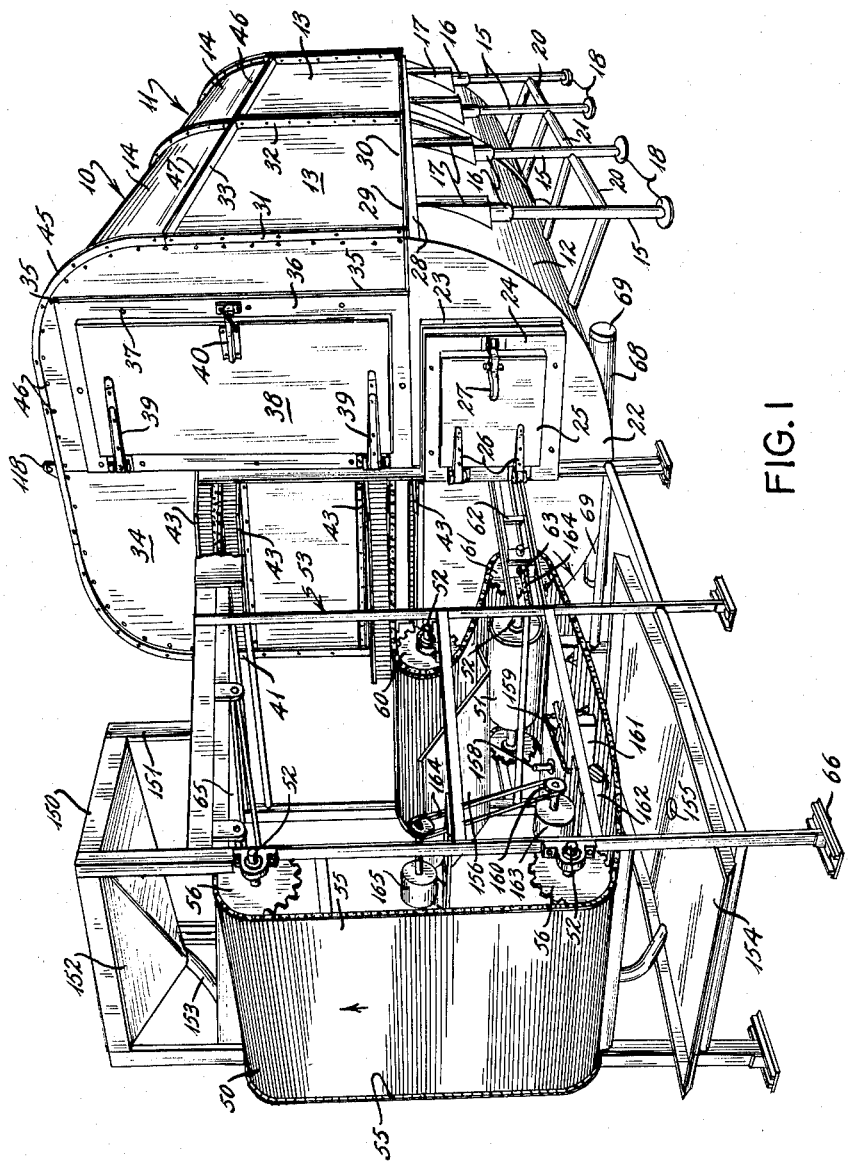

INVENTORS
WILLIAM J. WAKATSUKI,
DONALD W. CHRISTIANSEN and
MOSHE Y. DREKSLER

BY

ATTORNEYS

Jan. 4, 1966 W. J. WAKATSUKI ETAL 3,226,947
TUNNEL FREEZER
Filed Aug. 24, 1964 8 Sheets-Sheet 3

INVENTORS
WILLIAM J. WAKATSUKI,
DONALD W. CHRISTIANSEN and
MOSHE Y. DREKSLER
BY
ATTORNEYS Jan. 4, 1966 W. J. WAKATSUKI ET AL 3,226,947
TUNNEL FREEZER
Filed Aug. 24, 1964 8 Sheets-Sheet 4

INVENTORS
WILLIAM J. WAKATSUKI,
DONALD W. CHRISTIANSEN and
MOSHE Y. DREKSLER
BY
ATTORNEYS

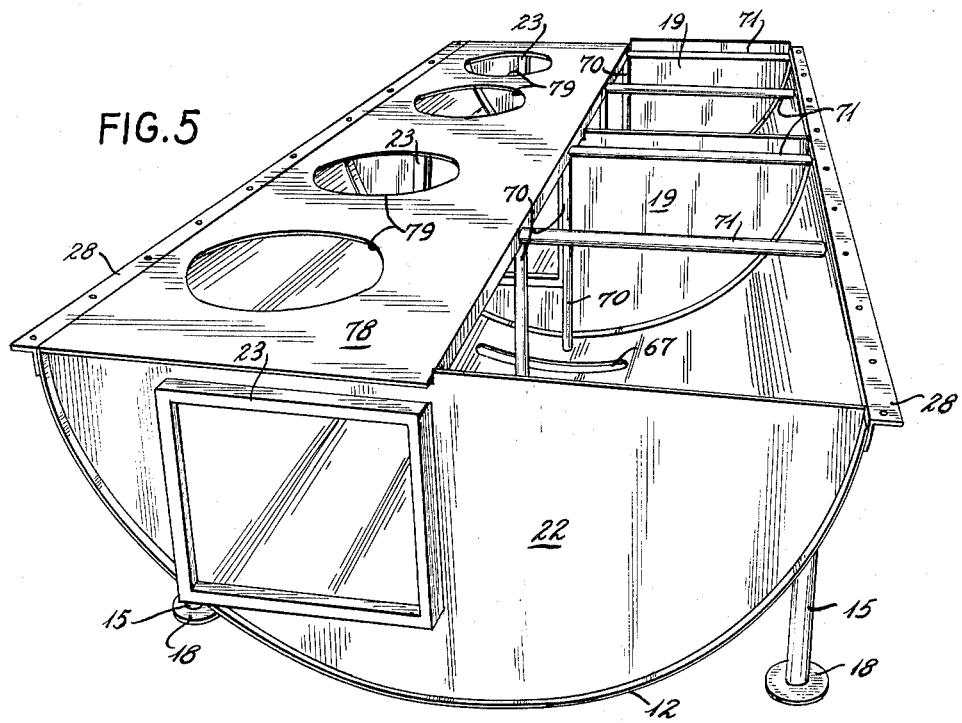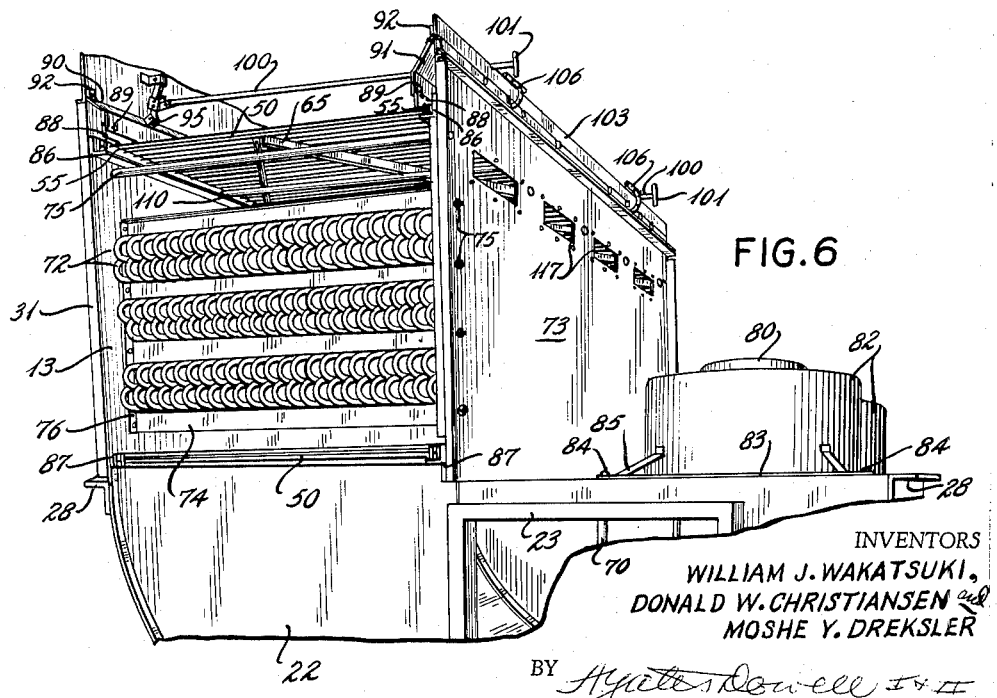
INVENTORS
WILLIAM J. WAKATSUKI,
DONALD W. CHRISTIANSEN and
MOSHE Y. DREKSLER
BY
ATTORNEYS

FIG. 9

FIG. 8

INVENTORS
WILLIAM J. WAKATSUKI,
DONALD W. CHRISTIANSEN and
MOSHE Y. DREKSLER

BY

ATTORNEYS

Jan. 4, 1966 W. J. WAKATSUKI ETAL 3,226,947
TUNNEL FREEZER
Filed Aug. 24, 1964 8 Sheets-Sheet 7
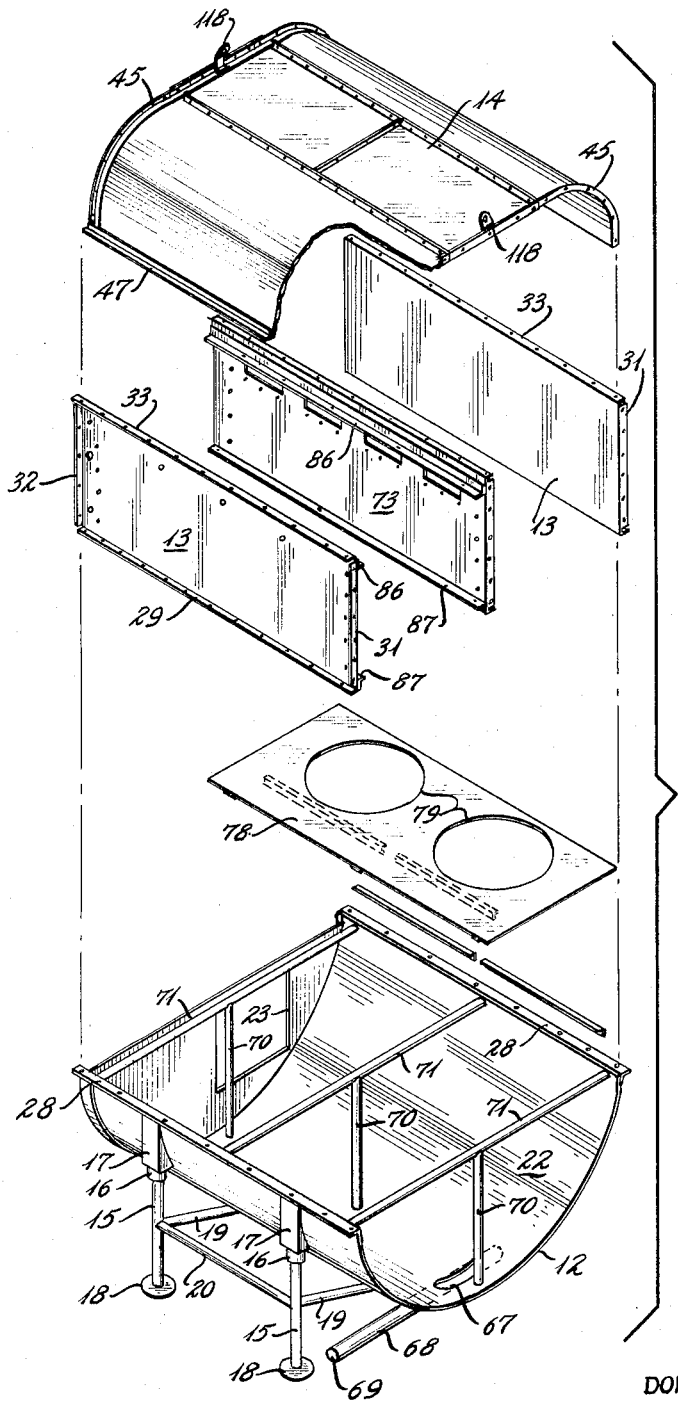
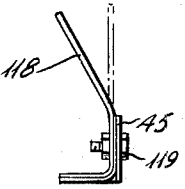
FIG.11
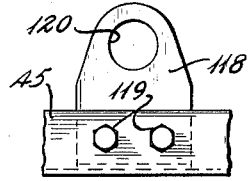
FIG.12
FIG.7
INVENTORS
WILLIAM J. WAKATSUKI,
DONALD W. CHRISTIANSEN and
MOSHE Y. DREKSLER
BY
ATTORNEYS

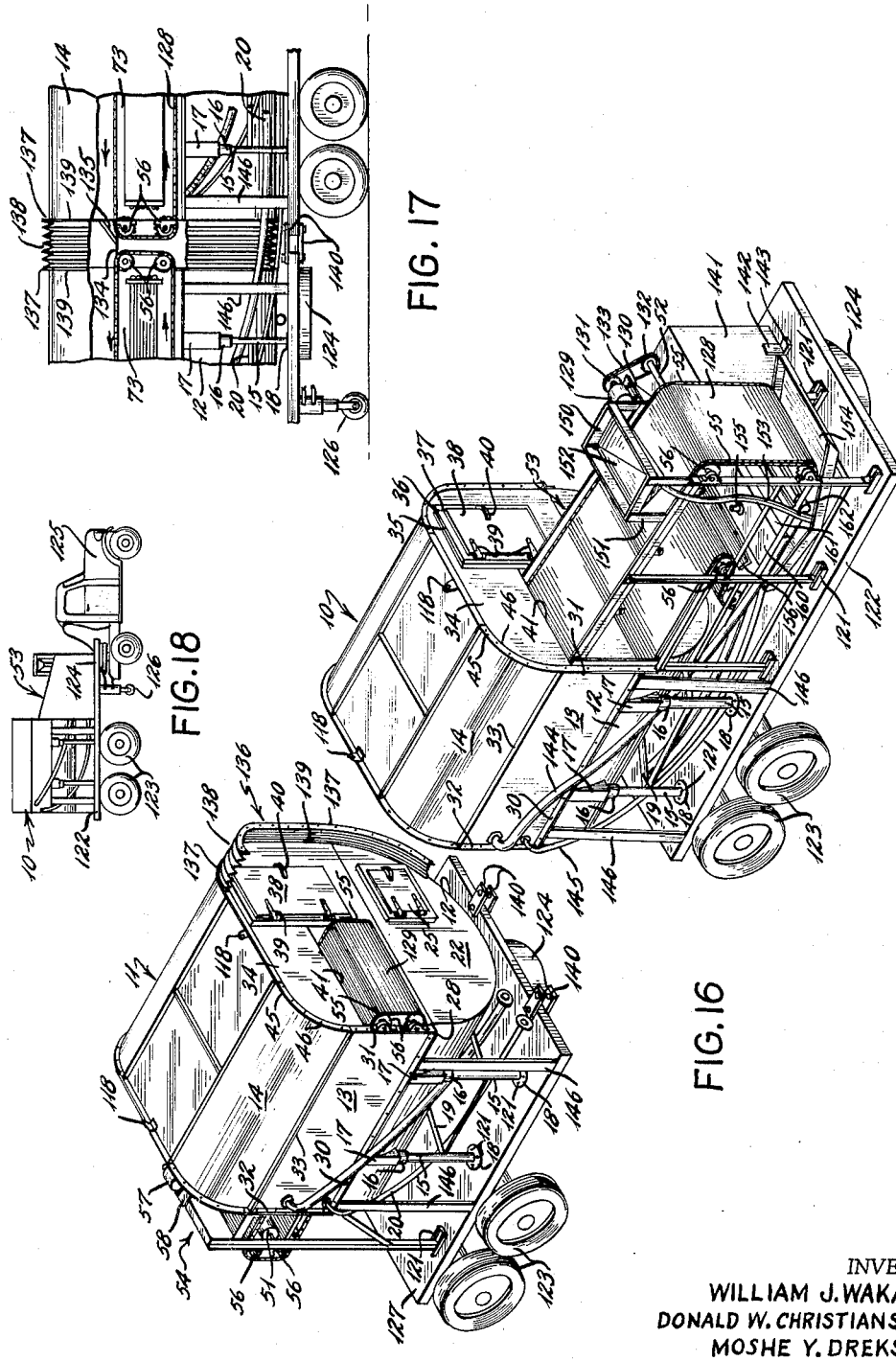

United States Patent Office 3,226,947
Patented Jan. 4, 1966

3,226,947
TUNNEL FREEZER
William J. Wakatsuki, Seabrook, N.J., Donald W. Christiansen, Hagerstown, Md., and Moshe Y. Dreksler, Waynesboro, Pa., assignors to Frick Company, Waynesboro, Pa.
Filed Aug. 24, 1964, Ser. No. 391,385
8 Claims. (Cl. 62—303)

This invention relates to the care and preservation of matter of various kinds, including that susceptible of rapid change in state occasioned by variations in temperature, and the invention relates to apparatus for modifying temperature in order to obtain that desired for any particular purpose and commodity.

The invention relates particularly to refrigeration apparatus for lowering temperature to the desired value, including sufficiently to quickfreeze, and especially for lowering the temperature of perishable foods and other matter in any manner, including either quickly, slowly, or at any rate desired.

Refrigeration has been accomplished mechanically in many ways, some of which have been more satisfactory than others, but in all various problems have been encountered making desirable further accomplishment and advancement. In sizable refrigeration installments, it has been customary to prepare an especially insulated foundation at a substantial investment in time, labor and material, as well as requiring a relatively large area for the installation. Also in prior systems food particles and debris have been known to collect on the cooling coils, air flow has not been fully distributed, and accumulation on the coils requiring defrosting and cleaning has involved shutting down of the system for substantial periods.

It is an object of the invention to provide a simple, compact, insulated, above ground, substantially self-cleaning, stationary or mobile refrigeration system, in which the cooling coils are between foraminated conveyor runs, with means for forcing air through the lower run of the conveyor which serves to distribute the air over the cooling coils and through the upper conveyor in downstream contact with the food or other material treated, as well as a refrigeration system which can be prefabricated in sections and erected in the field readily and quickly with a minimum of fitting and labor without the necessity for preassembly at the factory, or the provision of a special base on which to mount the installation.

Another object of the invention is to provide a device of the character indicated having a precooling area separate and segregatable from the main freezing area, maintaining therein relatively high temperature, while holding the low freezing temperature of the latter portion constant, and with walls defining the refrigerating chamber curved at the top and bottom without obstructions to facilitate circulation of air in a continuous path and cleaning, the structure having means for affording ready access to the conveyor and the coils for cleaning the other purposes and for mounting or supporting a spray head or other cleaning mechanism.

A further object of the invention is to provide refrigerating apparatus supported on braced stationary legs or on wheels and including refrigerating insulated chambers or compartments with unobstructed bottom, top, and intermediate side wall sections capable of being prefabricated and readily assembled and erected on location with a minimum of fitting and without pre-assembly in the factory and match-marking to insure accurate field assembly, as well as refrigerating apparatus having a precooling unit or area and a selective number of segments forming a freezing unit or area of the desired capacity.

Figure 2:
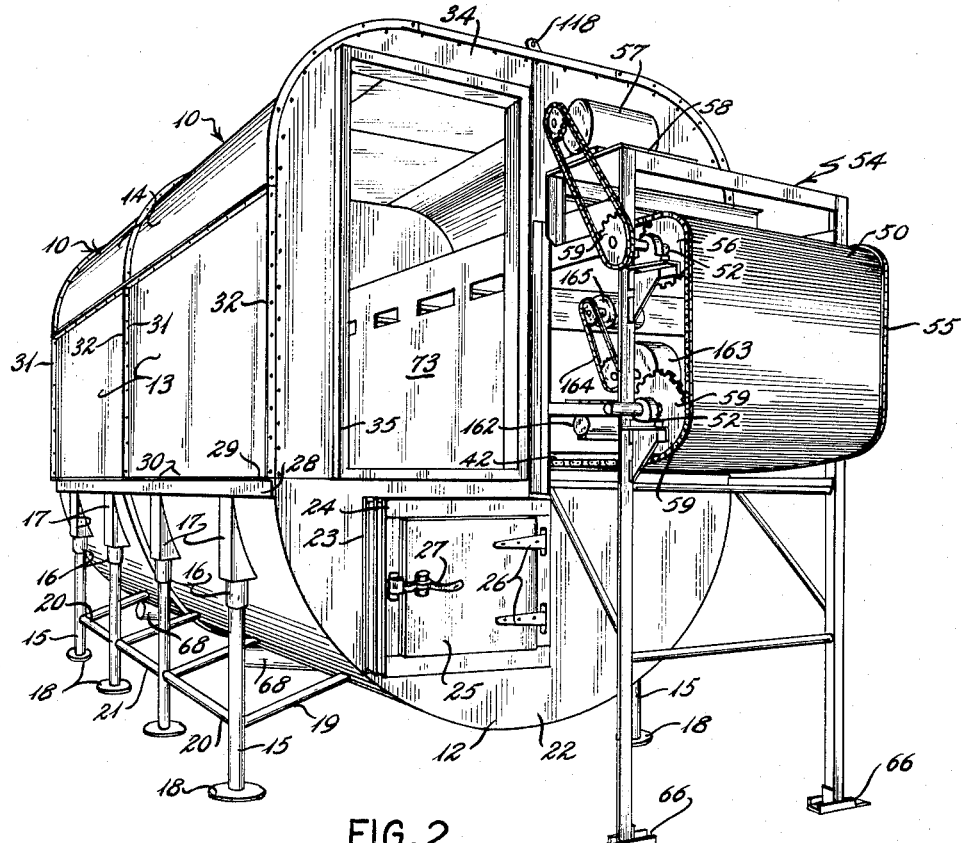
Figure 13:
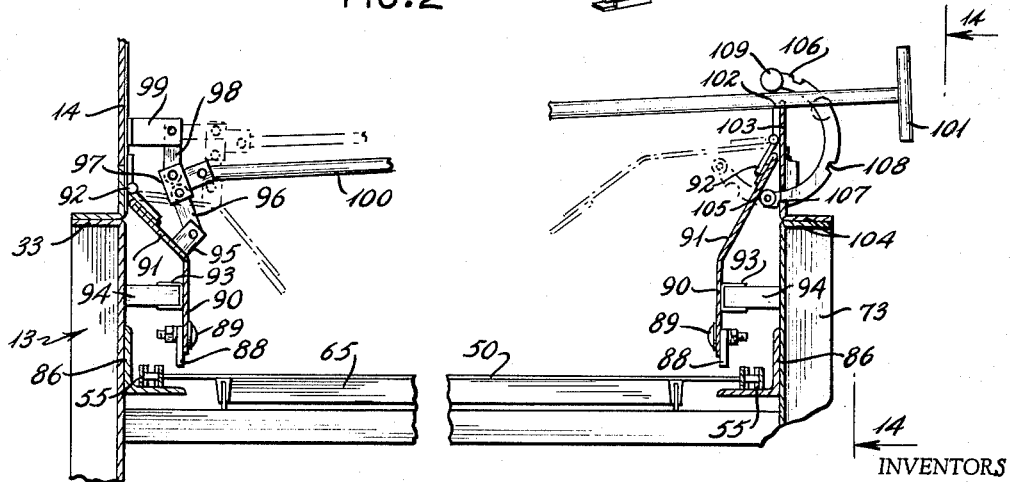
Figure 3:
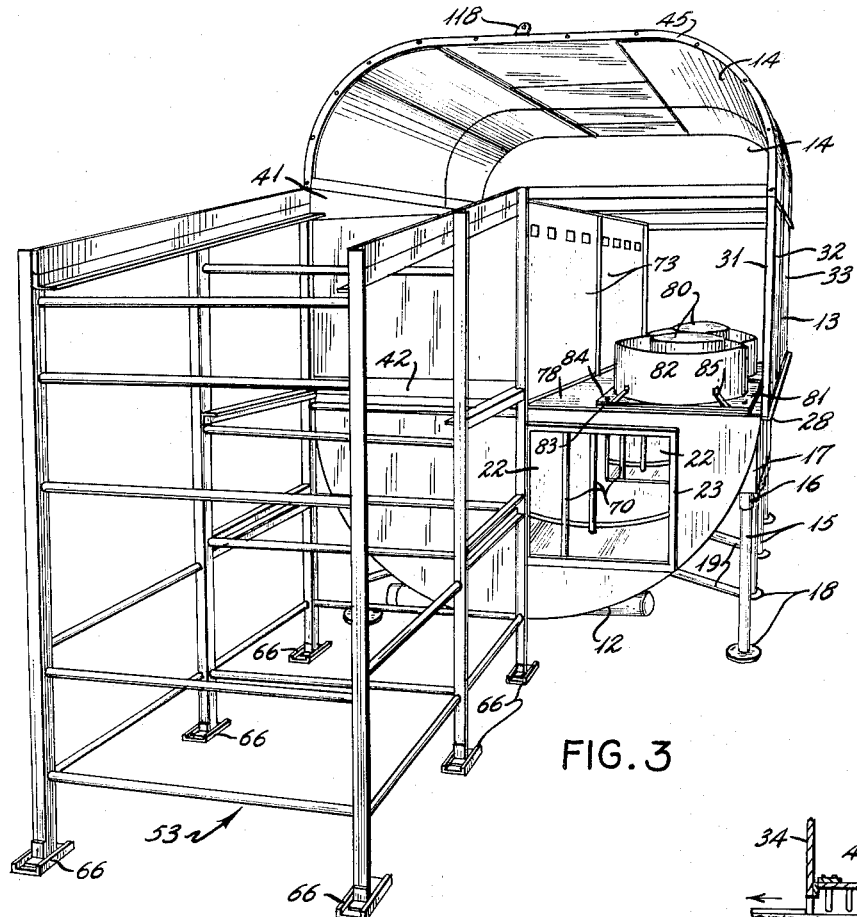
Figure 14:
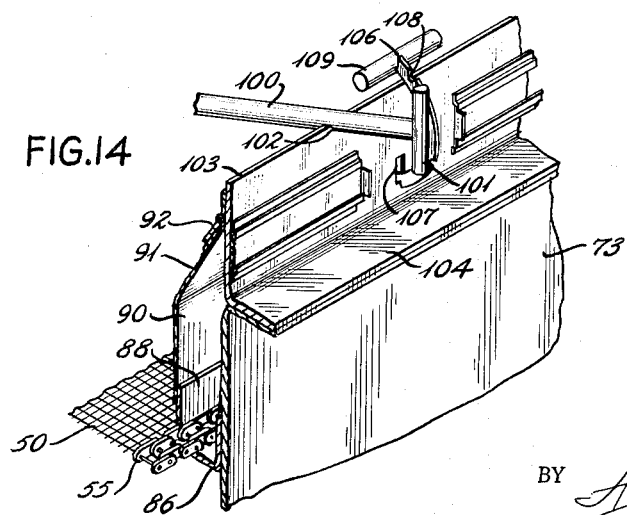
Figure 15:
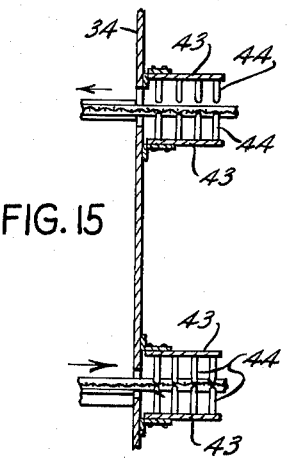
Figure 4:
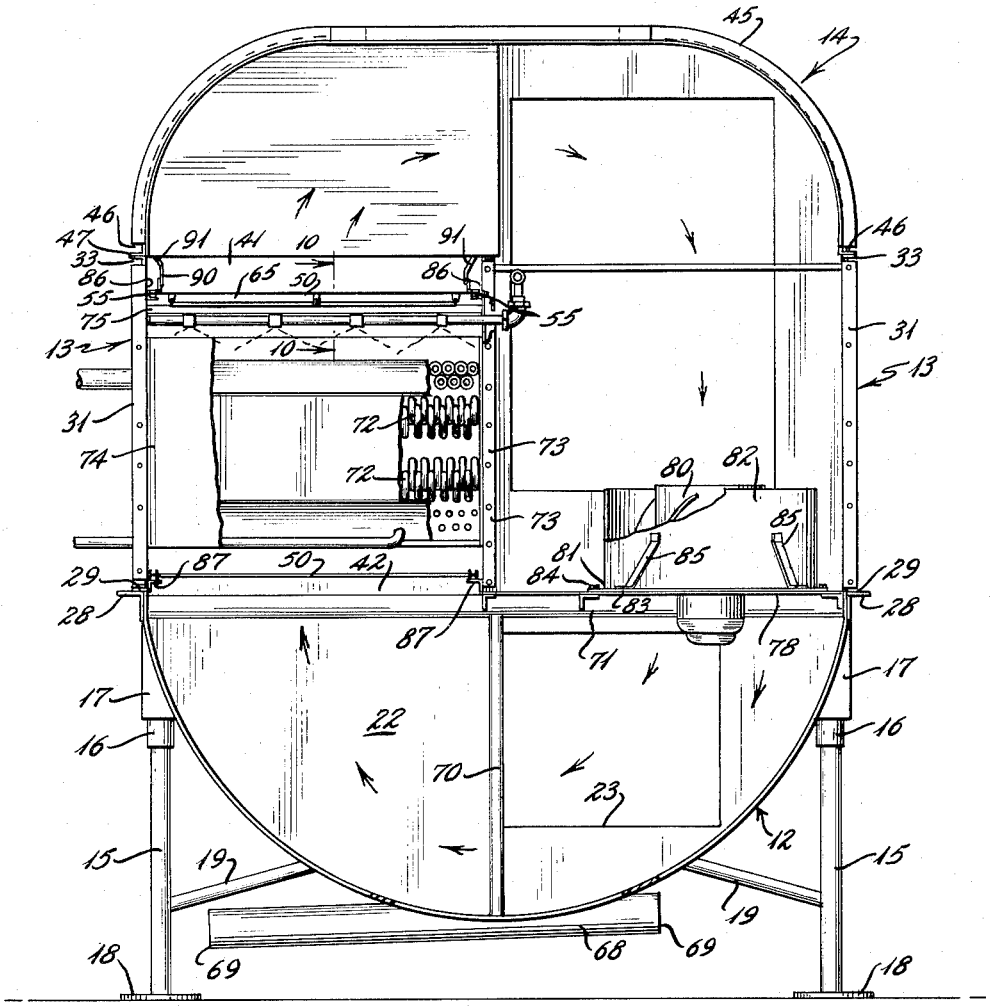
Figure 10:
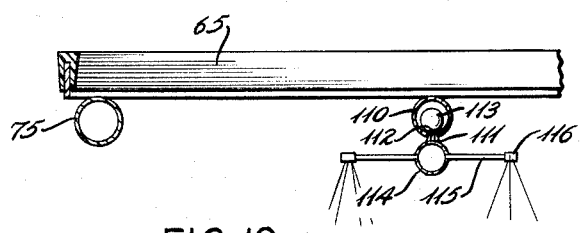

Other objects and advantages of the invention will be apparent from the following description taken in conjunction with the accompanying drawings in which:

FIG. 1 is a perspective illustrating one application of the invention viewed from the entrance end;
FIG. 2, a perspective from the discharge end;
FIG. 3, a perspective similar to that of FIG. 1 with parts removed for revelation of details;
FIG. 4, a vertical section;
FIG. 5, an enlarged perspective of the lower chamber-forming shell of the unit;
FIG. 6, an enlarged fragmentary detailed perspective showing the relation of the conveyor, cooling coils, and forced circulation means;
FIG. 7, an exploded perspective of the wall structure of one of the units;
FIG. 8, a part side elevation and part sectional view of an apparatus employing a single precooling unit and three freezing units;
FIG. 9, a top plan view of an apparatus employing a single precooling and three freezing units;
FIG. 10, a section (Sheet 4) on the line 10—10 of FIG. 4;
FIG. 11, a detailed side elevation (Sheet 6) of one of the fastening tabs;
FIG. 12, a detailed front elevation of such tab;
FIG. 13, an enlarged horizontal view showing track guards and adjusting means;
FIG. 14, a vertical view taken on line 14—14 of FIG. 13;
FIG. 15, an enlarged vertical section taken on line 15—15 of FIG. 9;
FIG. 16, a perspective of a mobile embodiment of the invention;
FIG. 17, a fragmentary vertical view showing the attaching means for mobile unit; and,
FIG. 18, a view showing means for transporting the mobile unit.

Briefly stated the invention is a freezer or an apparatus for subjecting matter of any desired character to subfreezing temperature and is composed of wall structure defining an area for precooling and an area for freezing, the latter being of a number of such units in accordance with the capacity required. Additionally a mechanical refrigeration system is provided for producing the refrigerating effect in the precooling and freezing area. The housing of each of the precooling and freezing units includes top, bottom and side walls, the top and bottom being curved to avoid sharp angles and dead spots, and the bottom being devoid of obstructions. An endless foraminous conveyor has its lower run located lengthwise over substantially one half of the bottom section with its upper run supported in spaced relation thereabve and with cooling coils between such upper and lower runs. Along the length of the remaining half of the bottom section is disposed a substantially horizontal floor with longitudinally spaced openings in each of which is mounted an air circulating blower or fan mounted to discharge in a downward direction so that air will strike the bottom and move across and upwardly through the lower run of the conveyor, the cooling coils, and the upper run of the conveyor and matter thereon. An upright wall with windows therein is disposed beside the run of the conveyor and the cooling coils, such wall forming in effect a barrier so that the air forced downwardly by the fan will not be drawn directly back to the fan without passing through the coils. The ends of each of the refrigerating units can readily be joined to additional units to provide preferably a precooling area and a freezing area of a desired number of freezing units. The invention includes two end walls and a third wall separating the precooling and freezing areas of the device with such walls each provided with a small door in the bottom section and a larger door in the upper section thereof. Each of the bottom sections is provided at each side with a pair of legs of adjustable height which support the bottom or base of the device near to but spaced above the earth or floor on which the device is mounted, thus avoiding the necessity for a preformed foundation, and preventing ground freezing. The wall structures provide a self-contained completely insulated path for the circulation of the refrigerated air independent of any surrounding structure and since it is completely insulated and mounted off the floor any additional enclosure is unnecessary. To facilitate cleaning the bottom is inclined with one end slightly lower than the other and at such end there is a transverse drainage sump with a tube which can be opened to permit flushing of the structure. Also, there are transverse supports beneath the upper run of the conveyor to which spray heads inserted through the windows in the partition beside the conveyor can be attached for defrosting and cleaning. The conveyor extends beyond each end of the apparatus for loading and unloading and is provided with means for adjusting tension on the same. Where the conveyor belt extends through the end wall sleeve and flap, means is provided for reducing leakage which means comprises at each pass of the belt through an upright wall a horizontal encircling wall of substantial length and containing one or more closure flaps. The invention may be prefabricated and assembled on location without preassembling at the factory and match-marking to insure accurate field assembly.

With continued reference to the drawings the device of the present invention includes a precooler 10 and a freezer 11 of like size and construction, each including a bottom 12, side wall structure 13 and a top 14 fastened together in any desired manner.

The bottom 12 is transversely rounded and is in fact almost a half cylinder, and is supported at each side by a pair of legs 15 extending into sleeves 16 carried by bosses 17 on the bottom wall 12. The sleeves 16 are of larger diameter than the legs 15 so that the legs may be readily inserted therein, mounted upon a supporting foot 18 and adjusted to the proper length.

Each leg 15 is connected to the bottom 12 by means of a brace 19, and each pair of legs 15 is connected by a brace 20 and a similar brace 21 is employed to attach the adjacent pairs of legs of the housing sections 10 and 11.

Three upright transverse walls 22 are provided, one dividing the precooling area from the freezing area of the device and the other two at the opposite ends of the structure. Each of these walls has a frame opening 23 to which is secured a door frame 24 and a door 25 which afford access therethrough. The door 25 is attached to the door frame 24 by hinges 26 and the door 25 and frame 24 are provided with a latch 27 which can be operated from opposite sides of the wall 19, the same structure being provided for each of the walls 22.

Along each side of the bottom is welded an angle 28 for the attachment of a flange 29 of the side plate 13 by means of bolts and nuts 30. The side plates are provided with end flanges 31 and 32 and a top flange 33. The flanges 31 have attached thereto vertical wall plates 34 which attach to the end plate 22 of the bottom, to the side plates 13 and to the top plate 14, such wall plates 34 having a framed opening 35 attached to door frame 36 by means of bolts and nuts 37, a door 38 being secured to the door frame by hinges 39 with a latch 40 operable from either side of the door.

The upright wall plate 34 has a belt opening 41 and between the lower edge of wall plate 34 and the upper edge end plate 22 is located at second belt opening 42. An annular sleeve 43 is secured within the enclosure around each opening and within such sleeves is one or more closure flaps 44 (FIGS. 8 and 15), the sleeve and closure flap construction being provided to reduce to a minimum air flow through such belt openings.

The top portions 14 are provided with end flanges 45 and to these end flanges and the flanges 31 of the side panels are secured by bolts 46 the end panels 34, such end panels being welded to the bottom panels 22 where such bottom panels are contacted. In like manner the top is provided with an outwardly turned flange 47 secured by similar bolts 46 to the flanges 33 and the panels 13. The panels which form the top of precooling and freezing sections likewise are bolted together and the bottom members are welded end to end to provide a continuous airtight housing and where the freezing area is composed of a number of such units these units are fastened together in like manner.

A conveyor belt 50 extends over rollers 51 mounted on shafts 52 in bearings on the frame 53 at the entrance end of the device and the frame 54 at the discharge end of the device. The conveyor includes spaced parallel chains 55 on sprockets 56 carried on the shafts 52, such chains being driven by a motor 57 resting on a platform 58 on the top of the frame 54 and driving the conveyor shaft 52 therebelow through a sprocket 59.

At the loading end of the device the conveyor is disposed around an idler 60 and a takeup 61 is provided connected to a slide 62 adjustable by a nut 63 on a threaded shaft 64. Thus the tightness of the belt can be adjusted and the belt flexed after it returns from the refrigerated areas to loosen any ice or other matter that may be frozen or otherwise attached thereto.

The upper run of the conveyor belt is supported by a wear strips grid made of nylon faced V-shaped bars or other low frictional material 65 (FIG. 9, Sheet 7). The lower ends of the loading and discharge frames 53 and 54 are anchored to supporting feet 66. The device is inclined so that one end is slightly lower than the other, and at the lower end of each section there is a clean-out sump or depression 67 which connects with pipes 68 to form wash-out openings with removable closures 69 at opposite ends.

In view of the fact that the device is inclined, only one clean-out sump or depression 67 is necessary, and since the matter treated travels in a substantially horizontal path, a minimum amount of power will be required for driving the same.

The bottom portions of the units are provided with vertical and horizontal interior bracing 70 and 71 respectively, the wall embracing structure which defines the cooling chamber being relatively strong and rigid although of relatively thin sheet material.

The conveyor 50 is substantially half the width of the refrigerating chambers or compartments 10 and 11, and between the upper and lower runs thereof are mounted cooling coils 72. Lengthwise substantially midway between the sides 13 are mounted upright partition plates 73 parallel to the side plates, and the coils are supported between the plates 13 and 73 by means of end members or plates 74 which maintain the coils in the proper relation, bolts and nuts 75 serving to secure the plates to right angular flanges 76.

Beside the conveyor is a floor 78 substantially half the width of the chamber and having openings 79 in which are received blowers or fans 80 mounted on base plate 81, each surrounded by an upright sleeve forming wall 82, which prevents air from entering anywhere but the top of the sleeve to be discharged downwardly through the floor. Beneath the base plate 81 is disposed a gasket 83 held in place by fasteners 84 which secure the base plate to the floor. If desired, brackets 85 additionally may support the sleeve 82 on the base plate 81.

Air discharged downwardly by the fans 80 will move across and pass upwardly through the lower run of the foraminous conveyor 50 and be distributed by such lower run so that it will have contact with the entire area of the cooling coils 72 and be refrigerated thereby. Air refrigerated from the cooling coils will pass upwardly through the upper run of the foraminous conveyor into contact with matter to be treated on such upper run and will travel upwardly in contact with the rounded top of the chamber and pass across the upright wall member 73 and be drawn downwardly and recirculated by the fans 80. Thus a continuous circulation of the air in a closed path is accomplished.

Food or other matter on the conveyor 50 will be carried through the precooling and refrigerating chambers, and therefrom in a substantially horizontal path using a minimum of power, and will be discharged from the conveyor after it leaves the chamber at the discharge end of the device near the motor 57 which drives the conveyor.

As illustrated in FIG. 13, in order to support the chains 55 which carry the conveyor 50 spaced pairs of upper and lower angles 86 and 87 are welded or otherwise attached to the side plates 13 and 73 so that they have generally horizontal portions which extend beneath the chains 55. In order to retain matter treated on the conveyor belt, guide bars 88 are secured by bolts and nuts 89 at each side of the conveyor to swingable arms having generally upright portions 90 and angular portions 91 and carried on hinges 92. The swinging of the arms on their hinges moves the bars 88 transversely of the conveyor. In order to limit this movement, holder yokes 93 are welded or otherwise carried by the portions 90 of the swingable arms and carry stop members 94 which limit the outward swinging of the arms. In order to adjust the position of the bars 88, linkage is provided, including a bracket 95 carried by the angular portion 91 of the swinging arm and connected by a link 96 pivoted to a connection 97, which in turn is pivotally connected on the lower end of a supporting link 98 pivoted to a fixed bracket 99 welded or otherwise secured to the top 14.

The movement of the bars 88 and associated linkage is produced by an operating bar 100 pivotally attached to the member 97 and said bar may have a handle 101 on the outer end so that when it is retracted the bar 88 will be moved in one direction and when it is returned or projected the bar will be moved in the opposite direction, the bar being provided with a notch 102 which receives the upper edge of a plate 103 having a flange 104 which attaches to the top flange of the side plate 73. In order to adjust the bracket 105 it has attached thereto an arcuate bar 106. This bar extends through an opening 107 in the plate 103 and has a series of notches 108 so that when the handle 109 of the bar is gripped the bar can be adjusted and by means of the opening in plate 103 engaging one of the notches, adjustment can be accomplished.

Attached across the underside of the low friction strip material of nylon or the like capped V-bars 65 which support the upper run of the conveyor 50 are slotted tubes 110, the slots 111 extending lengthwise along the bottom of the tube in order to receive the neck 112 of a support 113 larger than the slot 111 to be retained within the bar but small enough to slide freely into the tube 110. Attached to the lower end of the neck 112 is a spray header 114 having spaced lateral arms 115 carrying operating nozzles 116. The spray header assembly, including the supporting portions 113 is small enough to be inserted through opening 117 in the upright wall 73, making it possible to insert and remove such spray headers without difficulty, the openings 117 of such a size that they do not interfere with the air flow and also afford access to the underside of the upper run of the conveyor.

In order to facilitate handling of the top 14 a lifting tab 118 is secured in any desired manner, as for example, by bolts 119, to the upper central portion of the top 14, such tab having an opening 120 for the receipt of lifting means, such tab 118 normally being disposed relatively flat but capable of being bent out to a position of being readily engaged.

If desired the invention may be mounted on a flat bed trailer, as shown in FIGS. 16–18, to facilitate removal of the apparatus to various locations where freezing can be done in the field or near the place of origin or preparation of the material. To accomplish this, the loading unit 53 and precooler unit 10 may be mounted by bolts 121 on a trailer 122 having rear wheels 123, a hitch 124 to attach the trailer to a conventional tractor 125 and a hydraulically operated support wheel 126. Also the freezer 11 and discharge unit 54 may be similarly mounted on a trailer 127.

The conveyor belt 128 for the precooler and loading units may be driven by a motor 129 mounted on platform 130 through sprockets 131 and 132 and chain 133, the sprocket 132 being attached to the shaft 52 at the upper end of the loading section. At the discharge end of the precooler, a pair of sprockets 56 are mounted in spaced relation so that the conveyor belt 128 becomes self-contained in these units.

Another pair of sprockets 56 is mounted similarly at each entrance and discharge end of the freezing unit so that conveyor belt 129 is self-contained in these units. At the top run of the conveyor belt there is attached a chute 134 to act as a bridge for the material to pass from conveyor 128 to conveyor 129. The chute is attached to the unit by a supporting member 135. A flexible type closure 136 is formed of two end members 137 and a center portion 138 of expandable construction. One end member is attached to the entrance end by bolts 139 of the freezing unit while in transit, the other end member being attached by bolts 139 to the discharge end of the precooler on location, thus providing a flexible, air-tight joint while the machine is in operation. Connecting members 140 are provided adapted to be bolted or pinned to the trailer beds to further secure the beds in proper relation.

A compression refrigeration system 141 is mounted by brackets 142 and bolts 143 on trailer 122 near the loading unit, having flexible tubing connections 144 and 145 to the suction and liquid inlet for the cooling coil. The units are further braced by supports 146.

Matter to be frozen is placed on a shaker table 150, supported on the frame 53 by means of legs 151. Beneath the table is a drain pan 152 with a flexible discharge hose 153, the lower end of which discharges into a drain pan 154, having a discharge opening pipe 155.

The return portion of the conveyor 50, where it emerges from the freezer and extends around an idler drum 60, has disposed beneath it a trough 156 for catching particles of ice and the like which fall from the conveyor. This trough is welded at its ends to the frame structure 53. The trough also has its ends open to permit such matter to be brushed from either end thereof.

As a further aid in removing ice and other substances from the belt, a header 157 is provided, supplied with water through a pipe 158 and along the header are attached a series of downwardly-directed spray nozzles 159. Water discharged through these spray nozzles onto the conveyor belt will serve to clean the latter. This water will be caught in the lower drain pan 154 and discharged through the discharge opening 155. The spray header 157 is provided with a cover 160, having depending sides 161. After water is sprayed onto the conveyor, the conveyor moves beneath an air dryer 162, through which air is forced from a blower 163, driven by a belt 164 from a motor 165, all mounted on the frame 53 of the machine.

At the opposite end of the machine, as illustrated in FIG. 2, a similar blower 163, driven by a belt 164 from a motor 165, is employed for drying the conveyor.

In operation, matter to be frozen is deposited on the shaker table 150 from which it is discharged onto the conveyor 50 by which it is conveyed through the precooling and freezing chambers 34 and discharged from the remote end thereof. Refrigerant is supplied to the cooling coils 72 in a conventional manner and under suitable controls, the precooling section of the system being maintained at a higher temperature than that of the freezing section. The freezing section in which quick-freezing is accomplished is composed of one or more units corresponding to that of the precooling system and dependent upon the capacity required. Food or other matter loaded onto the conveyor 50 from the shaker table 150 will be carried by the conveyor 50 through the opening 41 into the precooling chamber, then along a substantially horizontal path to the precooling chamber through a second opening 41 into the refrigerating chamber and then from the refrigerating chamber through a third opening 41 to the exterior, after which matter on the conveyor will be discharged near the motor 57 which drives the conveyor.

After the matter is discharged, the conveyor is subjected to a blast of air through the slotted discharge of the air drier 162 from the blower 163 driven through the belt 164 from the motor 165 mounted on the frame 54. The return of the conveyor passes through openings 42 in the rear wall, intermediate wall and front wall of the freezing and precooling chambers, after which it passes over the idler drum or pulley 60 beneath which is located an open-ended trough 156 onto which ice or foreign matter will drop and can be removed from either end of the trough 156.

As food or other matter is carried on the conveyor 50 through the precooling and refrigerating chambers, air is forced by the blowers or fans 80 continuously in a direction transverse to the movement of the conveyor, then downwardly and along the lower portion of the chamber, and then upwardly through the blower run of the foraminous or open-work conveyor, the construction of which serves to distribute the air over the entire area of the overlying cooling coils in complete contact therewith for maximum cooling of the same, after which the air is drawn transversely and recirculated by the blowers.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. Refrigerating apparatus having precooling and freezing areas with means for segregating one from the other and comprising insulated top, bottom, and side wall structure including a vapor seal, a foraminous conveyor extending lengthwise of said precooling and freezing areas and having upper and lower runs, said apparatus having transverse walls with openings therein, through which said conveyor extends, structure for preventing excessive leakage through said openings, cooling coils mounted between said upper and lower conveyor runs, a floor beside said conveyor and a partition between said floor and said conveyor, blower means for forcing air downwardly through said floor so that it will be partially compressed and caused to engage said bottom and be deflected upwardly through the lower and upper runs of said conveyor, the lower foraminous conveyor run serving to distribute air over said cooling coils thereabove and subsequently in downstream contact with the upper run of the conveyor and matter to be refrigerated carried thereon, said bottom structure being inclined and having a sump with one or more discharge connections to the exterior to facilitate cleaning, said freezing area being composed of a selected number of refrigerating sections according to the capacity desired.

2. Refrigerating apparatus comprising a plurality of units each having bottom, side, and top portions combined to provide an insulated chamber to be refrigerated, said bottom being rounded from side to side and having a relatively smooth interior with one end slightly lower than the other for drainage purposes, a sump in the lower end of said bottom with an opening to the exterior, a closure for said opening, a floor along substantially one-half of the upper portion of said bottom with openings spaced therealong, blowers for producing forced draft of air downwardly through said openings, a foraminous conveyor having generally parallel upper and lower runs disposed lengthwise of said chamber beside said floor, an upright partition forming wall extending lengthwise of said chamber whereby air forced upwardly through the runs of said foraminous conveyor will be forced to travel a substantial distance upwardly before it can be returned to said blowers, cooling coils located between the upper and lower runs of said conveyor whereby air will be forced past the lower run and be distributed over the coils and then caused to pass through the upper run of the conveyor and in contact with material supported thereon.

3. The structure of claim 1 and means mounting said refrigerating apparatus for mobility.

4. The structure of claim 2 and means mounting said refrigerating apparatus for mobility.

5. The structure of claim 1, said refrigerating apparatus including upright walls with openings for the passage of said conveyor therethrough and sleeve means around said openings for reducing air passage through said openings.

6. Refrigerating apparatus having adjoining precooling and freezing areas, means for segregating one area from the other, a foraminous conveyor having a conveying and return run extending generally horizontally lengthwise along said precooling and freezing areas, cooling coils located between said runs, walls defining the limits of said areas, said walls having openings through which said conveyor extends, a sleeve disposed about each of said openings and extending for a substantial distance along said conveyor, flaps extending inwardly from said sleeve in a manner to be engaged by said conveyor to restrict leakage through said openings, means for producing forced circulation of air across said conveyor and in a direction so that the air will pass through the return run of the conveyor and be distributed thereby and caused to pass into contact with said cooling coils and recirculated by said blowers, a discharge from the lower portion of said areas to the exterior to facilitate cleaning, and spray means for cleaning said conveyor exteriorly of said areas.

7. Refrigeration apparatus for articles to be treated, comprising an elongated lower heat insulated section having a substantially semi-circular internal configuration in cross-section, an elongated upper heat insulated section adjoining said lower section and having a substantially inverted rounded internal configuration in cross-section, each section having closed ends to provide in assembled relation a chamber to be refrigerated, cooling means within said chamber located adjacent one side of the rounded section, means for causing circulation arranged to produce air flow transversely in said chamber in a manner to be directed in an endless path within said chamber by said configurations, a partition extending the full length of said chamber adjacent said cooling means and in spaced relation to the longitudinal surfaces of said section such that circulation is through said cooling means and around said partition, and conveyor means for moving the articles along said cooling means within the path of flow of the circulated air.

8. The structure of claim 7 and means mounting said refrigerating apparatus for mobility.

References Cited by the Examiner
UNITED STATES PATENTS

| | | | |
|---|---|---|---|
| 2,223,972 | 12/1940 | Sterling | 62—380 X |
| 2,533,125 | 12/1950 | Levinson et al. | 62—380 X |
| 2,584,628 | 2/1952 | Skillman | 62—380 X |
| 2,723,533 | 11/1955 | Mann | 62—291 X |
| 3,110,163 | 11/1963 | Webb | 62—380 X |
| 3,115,756 | 12/1963 | Overbye | 62—380 X |
| 3,173,276 | 3/1965 | Martin | 62—380 |

ROBERT A. O'LEARY, *Primary Examiner.*

W. E. WAYNER, *Assistant Examiner.*